3,097,106
METHOD OF APPLYING A MAR-RESISTANT SURFACE COATING TO THERMOPLASTIC SHEETS
Elkan R. Blout, Belmont, Harold O. Buzzell, Wollaston, and Leonard C. Farney, Melrose, Mass., assignors to Polaroid Corporation, Cambridge, Mass., a corporation of Delaware
Filed Dec. 26, 1962, Ser. No. 247,092
11 Claims. (Cl. 117—64)

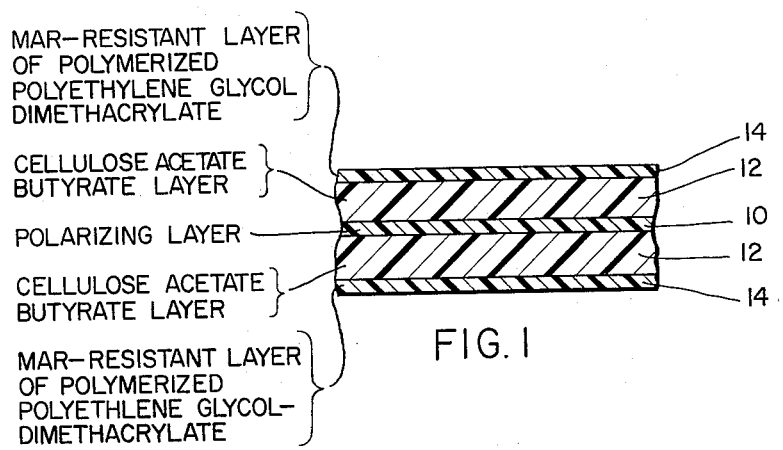
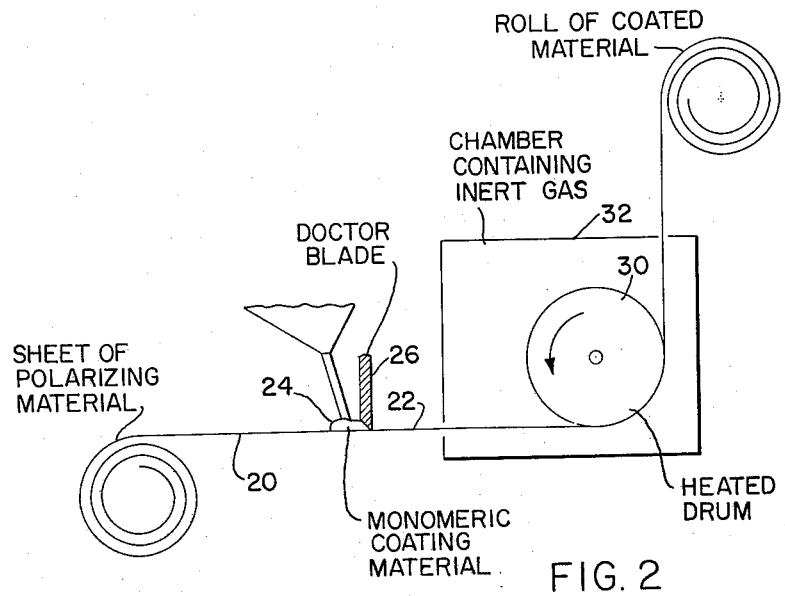

The present invention relates to plastic coating processes and more particularly to processes for applying cross-linked mar-resistant, surface coatings to plastic sheets and laminates and especially to plastic optical elements.

Objects of the present invention are to provide continuous methods for the in situ polymerization of mar-resistant, cross-linked surface coatings on plastic sheets and laminates and especially on plastic optical elements.

Other objects of the invention will in part be obvious and will in part appear hereinafter.

The invention accordingly comprises the processes involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing in which FIGURE 1 represents diagrammatically and in section a product produced by the processes of the invention and FIG. 2 represents diagrammatically a preferred embodiment of the process of the invention.

Thermo-setting, cross-linked polymers are finding wide use as mar-resistant finishes for plastic sheets and laminates. Because of the inherent insolubility and non-thermoplasticity of such coatings, it is usually necessary to carry out the polymerization of such polymers in situ. The present invention is concerned with continuous processes for the application of such polymers to plastic sheets and laminates and especially with continuous processes for applying such cross-linked polymers to sheets of plastic optical material to produce optical elements such as disclosed and claimed in the copending application of Blout, Buzzell and Farney, Serial No. 539,219, filed October 7, 1955; the present application is a continuation-in-part of said application Serial No. 539,219 and also of application Serial No. 25,705, filed April 29, 1960 (now abandoned), as a continuation-in-part of said Serial No. 539,219.

The sheets of plastic optical material on which the continuous coating processes of the present invention are especially useful comprise a lamination or sandwich of a central layer of light-polarizing material such, for example, as molecularly oriented polyvinyl alcohol which has been dyed or stained with a dichroic dye, usually a dye comprising iodine and an iodide, so that there is formed therein a sorption complex of iodine on molecularly oriented polyvinyl alcohol. This centrally disposed layer or film of polarizing material is bonded on each of its surfaces to an outer protective sheet of a cellulosic compound such, for example, as cellulose acetate butyrate, cellulose acetate or cellulose triacetate. The polarizing layer may have a thickness of the order of 0.001 inch, and each of the outer protective layers may have a thickness of from 0.010 to 0.015 inch.

In the practice of the process of the present invention, a thin layer or film of a difunctional cross-linkable monomer, polymerizable by a polymerization catalyst to produce a cross-linked polymer, is applied to a surface of the plastic sheet or lamination, and the sheet so coated may then be brought into contact with an optically smooth, heated element and held under slight pressure in contact therewith for a short period of time and until the coating has polymerized to form a mar-resistant, three-dimensional polymer.

In a preferred embodiment of the invention, polymerization is effected in less than three minutes. The heated, optically smooth pressure element against which the coated plastic lamination is held is a cylindrical element, e.g., drum, wheel, etc., which rotates continuously so that polymerization is effected during the period of contact of the coated sheet with the periphery of the polymerizing wheel and while the sheet is traveling past the wheel. In other embodiments of the invention, polymerization may be effected within an oven and, if desired, by bringing optically smooth platens successively into contact with the coated surface of the traveling sheet and maintaining the platens in contact with the surface as the sheet travels through the oven.

The preferred materials, which are used in the formation of the mar-resistant coatings on the plastic optical element, are diethylenic derivatives of polyalkyleneglycols comprising at least 3 alkylene groups. Monomers which are derivatives of polyalkyleneglycols comprising 3 to 5 alkylene groups and especially those wherein the alkylene groups comprise 2 to 3 and preferably 2 carbon atoms have been found to be particularly useful. Preferred monomers are the diesters formed from the polyalkyleneglycols and polymerizable $\alpha,\beta$-unsaturated carboxylic acids, e.g., methacrylic and acrylic acid. As examples of such monomers, mention may be made of: triethyleneglycol dimethacrylate, triethyleneglycol diacrylate, tetraethyleneglycol dimethacrylate, tetraethyleneglycol diacrylate, pentaethyleneglycol dimethacrylate, and pentaethyleneglycol diacrylate.

The above-mentioned preferred polymerizable materials, i.e., the diethylenic derivatives of polyalkyleneglycols comprising at least 3 alkylene groups, are especially adaptable to the continuous process of this invention in that they produce cross-linked polymers which are hard and mar-resistant, but which are yet unexpectedly flexible and deformable. This flexibility and deformability enables the resulting coating to assume the contours of the periphery of the cylindrical element during polymerization to a thermoset polymer and after polymerization to be removed from the drum and straightened without crazing and cracking.

Highly satisfactory coatings have been obtained from such materials as those sold commercially by Monomer Polymer Corporation under the trade name "M P L" and by E. I. du Pont de Nemours & Co. under the trade name "B C M." These materials are believed to be polyethyleneglycoldimethacrylates and are substantially indistinguishable when employed in the process of the present invention from tetraethyleneglycoldimethacrylate or from polyethyleneglycoldimethacrylate made from polyethyleneglycol having an average molecular weight of about 200.

The monomeric polyethyleneglycols which are preferred for use in the practice of the present invention are of relatively low viscosity and, in order that they may be more readily handled and applied to the surface of the optical element to be coated in the manner hereinafter described, the viscosity of the coating composition may be increased by mixing with the monomeric polyethyleneglycol a small percentage of cellulose nitrate, e.g., about 5 to 10% by weight. Where tetraethyleneglycoldimethacrylate is employed as the difunctional monomer, the addition thereto of not more than 10% by weight of one-half second viscosity cellulose nitrate results in a coating composition of a preferred viscosity such that it may be applied to the surface of the sheet to be coated and thereafter polymerized in situ in the manner hereinafter described.

The addition of the cellulose nitrate to the coating composition is believed also to improve the adhesion or bond between the coating and the plastic sheet to which it is applied, and this is especially so when the plastic sheet comprises cellulose acetate butyrate. In certain cases, for example, where the sheet to which the coating is applied comprises cellulose triacetate or where polymerization of the coating is effected in an oven, it has been found desirable to employ a thin subcoat of nitrocellulose, which is applied to the plastic sheet prior to the application of the coating mixture thereto. It is to be understood, however, that the use of the subcoat may not be essential to the practice of the present invention in certain circumstances, nor need the coating necessarily comprise nitrocellulose.

Preferably, the coating applied to the plastic sheet is of such thickness as to give adequate abrasion or mar resistance, and, where optical elements are subsequently to be cut or stamped from the sheet, the coating should be no thicker than is necessary to give such resistance, for a thick mar-resistant coating has been found to increase greatly the difficulty of cutting or stamping out lenses from the coated sheet as they tend to craze or crack adjacent the cut edges. A preferred coating thickness is of the order of about 0.001 to 0.002 inch. Coatings of this thickness are adequately mar-resistant. A sheet so coated on both surfaces may have such optical elements as lenses stamped therefrom, and these lenses may be subsequently shaped in a suitable press to the desired curvature, whereas thicker coatings give no effective additional mar resistance and increase substantially the difficulty of cutting out and shaping lenses from the coated sheet.

In FIG. 1 there is illustrated diagrammatically and in section a portion of a light-polarizing lens embodying the invention. The central polarizing layer 10 is bonded on each face to a cellulose acetate butyrate layer 12, and mar-resistant coatings 14, comprising polymerized polyethyleneglycoldimethacrylate, have been formed on the outer surfaces of the lamination.

The present invention preferably provides a continuous process for the formation of a mar-resistant coating on the plastic sheet of the character described, i.e., a process in which the coating is continuously and progressively applied to the surface of a sheet and is then polymerized in situ thereon while the sheet is moving continuously through the coating and polymerizing stages. Preferably, polymerization is accomplished relatively quickly, and in a preferred embodiment of the invention polymeriaztion is accomplished within a period of from one and one-half to three minutes.

While the monomeric polyethyleneglycols which are preferably employed in the present invention may be polymerized thermally or by the use of ultraviolet light, it is preferred to employ also a polymerization catalyst, such as a peroxide, an azo compound, a percarbonate or other known free radical producing catalysts. Where a peroxide catalyst is employed, an accelerator such, for example, as a hydrated cobalt nitrate or other known metallic salt accelerator may preferably be employed. It is desirable to mix with the coating composition about 1 to 3% by weight of the polymerization catalyst such, for example, as benzoyl peroxide or diisopropyldipercarbonate. Polymerization is then effected by heating, and where the peroxide catalyst is employed the coated sheet should be heated to a temperature of about 110° C. to effect polymerization within the desired period. When diisopropylperoxydicarbonate is used as the catalyst, temperatures of about 180° F. will suffice. An especially useful catalyst is α-naphthoyl peroxide. This catalyst, whose use in the processes of this invention is disclosed and claimed in U.S. Patent No. 3,019,131, issued to Howard C. Haas and Norman W. Schuler on January 30, 1962, effects polymerization at about 200 to 205° F. Such low temperatures are desirable in order not to exceed the softening point of the underlying thermoplastic layers.

Polymerization of the polyalkyleneglycols employed in the practice of the present invention is strongly inhibited by atmospheric oxygen and should, therefore, be carried forward in an air-free atmosphere, for example in carbon dioxide, or against a surfacing element, such as a polished wheel.

In FIG. 2 there is illustrated diagrammatically a preferred embodiment of the process of the present invention. A sheetlike plastic material 20, for example the light-polarizing lamination heretofore described, which comprises a central polarizing layer or film adhesively bonded to two outer protective plastic layers of a cellulosic compound such as cellulose acetate butyrate, is coated on one surface with a layer 22, approximately 0.002 inch in thickness, of a mixture of the monomeric polyethyleneglycol-dimethacrylate, nitrocellulose and a polymerization catalyst in the proportions heretofore described. The coating may be applied as a viscous mass 24, in any suitable manner, and passed under the doctor blade 26, or it may be sprayed or flowed onto the sheet. The coated sheet is then brought into contact with an optically smooth surface such, for example, as the peripheral surface of the wheel 30. The sheet is held against the wheel under sufficient pressure to cause the surface of the applied coating to assume the smooth optical properties of the wheel surface. While the sheet is held against the wheel, it is heated and polymerization of the coating is effected. The wheel continuously rotates, and the sheet continuously advances with the coated surface in contact with the wheel for the period during which polymerization is effected, for example for a period of from one and one-half to three minutes. The opposite surface of the sheet is then similarly coated and, after both surfaces have been so treated, optical elements are stamped or cut from the sheet.

In a modification of the process, the sheet with the monomeric mixture applied to one surface may be passed through a polymerizing oven in an air-free atmosphere, for example an atmosphere of $CO_2$, until polymerization is effected. It has been found that, in this modification of the process, the use of a nitrocellulose subcoat between the polymerized, mar-resistant coating and the light-polarizing lamination not only increases adhesion of the coating to the lamination but also improves the transparency of optical elements cut from the coated sheet.

Moreover, while contact with the cylindrical element, in that embodiment of the process of the invention first described, adequately excludes air from the coating, an atmosphere, 32, of $CO_2$ may, if desired, be employed here also.

It has been found desirable to bring the coated sheet into contact with any optically smooth surface against which the polymerization of the coating is effected prior to the conversion of the monomeric coating to a gel, for once a gel has formed, any imperfections in the surface of the coating are eliminated only with great difficulty. Moreover, after the coating has been polymerized, while it readily conforms to such curvature as may be imparted to lenses cut from the coated sheet and then formed into optical six-curve lenses, only the most minor surface imperfections are eliminated by press-polishing or such subsequent molding or shaping of the lenses. Accordingly, if a high yield is to be obtained, the surface of the element against which the coated sheet is held as polymerization of the coating is effected should be as free from blemishes and as optically smooth as possible.

It will be understood that the mar-resistant coating of the character described may be applied to elements and devices other than light-polarizing lenses and filters. It may, for example, be applied to colored, cellulosic filters and lenses such as are employed in nonpolarizing sunglasses and visors. It may be applied, also, as a coating to plastic laminates where scratch- or mar-resistant properties are desired.

Moreover, in the manufacture of light-polarizing elements, the mar-resistant coating may be directly applied to the light-polarizing layer or film and one of the cellulosic cover sheets eliminated. Under these circumstances, it is desirable that a subcoat of nitrocellulose be employed or that other subcoats known to the art and comprising, for example, mixtures of nitrocellulose and polyvinyl alcohol, be employed to improve adhesion between the polymerized mar-resistant coating and the molecularly oriented polyvinyl alcohol polarizing layer of the lamination.

The following nonlimiting examples illustrate the processes of the present invention.

Example 1

A sheet of a plastic laminate comprising an inner polarizing layer of iodine-stained, molecularly oriented polyvinyl alcohol sandwiched between two outer layers of cellulose acetate butyrate was coated with a coating solution about 1 mil thick, comprising monomeric tetraethyleneglycoldimethacrylate, 5% cellulose nitrate (based on the weight of the monomer) and 1.0% diisopropylperoxydicarbonate (based on the weight of the monomer). The monomeric coating was brought into contact and held against the optically smooth surface of a revolving drum which was heated to about 180° F. The coating, while advancing, was held against the smooth surface of the revolving drum until it was polymerized to a thermoset cross-linked polymer. The resulting coated laminate which had assumed the contour of the drum during polymerization was then removed and straightened. No cracking or crazing in the outer mar-resistant coating was observed.

Example 2

The process of Example 1 was repeated except triethyleneglycoldimethacrylate was substituted for the tetraethyleneglycoldimethacrylate. When the laminate comprising the thermoset, mar-resistant layer was removed from the drum and straightened, no signs of cracking or crazing were observed.

The following example illustrates the criticality of the monomeric materials in the processes of the present invention.

Example 3

In a manner similar to Example 1 a sheet of a plastic laminate comprising an inner polarizing layer of iodine-stained, molecularly oriented polyvinyl alcohol sandwiched between two outer layers of cellulose acetate butyrate was coated with a coating solution, about 1 mil thick, comprising monomeric ethyleneglycoldimethacrylate, 5% cellulose nitrate (based on the weight of the monomer) and 1.0% diisopropylperoxydicarbonate (also based on the weight of the monomer). The monomeric coating was brought into contact and held against the optically smooth surface of a revolving drum which was heated to about 180° F. The coating, while advancing, was held against the smooth surface of the revolving drum until it was polymerized to a thermoset cross-linked polymer. The resulting coated laminate which had assumed the contour of the drum during polymerization was removed and straightened. Extensive cracking and crazing was observed in the outer mar-resistant coating during the removal and straightening of the sheet.

Example 4

The process of Example 3 was repeated except diethyleneglycoldimethacrylate was substituted for the ethyleneglycoldimethacrylate. When the laminate comprising the thermoset, mar-resistant layer was removed from the drum, cracking and crazing were observed.

It is recognized that there is no completely satisfactory test for comparing the surface hardness or abrasion resistance of different materials and that it is difficult to correlate laboratory abrasion data with performance in the field. Sunglasses employing lenses comprising the mar-resistant coatings of the present invention have been tested in the field under conditions of normal usage, and the coated lenses have also been subjected to such abrasion tests as are prescribed, for example, in the A.S.T.M. Handbook on Standards on Plastics, 1953 edition. These tests include the so-called falling Carborundum test, the transverse abrader test and the rotary abrader test.

Abrasion resistance is most commonly measured either in terms of the physical loss of volume or in terms of a change in optical properties, such as haze increment, which the material undergoes while being subjected to the abrading action. With optical elements such as those produced by the processes of this invention, haze increment is believed to be the more satisfactory measure of mar resistance. In every case, the coated lenses embodying the present invention showed substantially less haze increment after subjection to the abrasion test than did similar lenses, coated with other hard coatings heretofore used commercially, with which they were compared. Lenses subjected to normal usage which were coated in accordance with the present invention showed such improved mar resistance as to extend greatly the useful life thereof. They showed substantially no increase in haze after several months of normal usage and at the expiration of periods within which other differently coated lenses with which they were compared had developed such surface scratches and imperfections as to render them substantially unfit for use.

Moreover, the addition of the hard surface coating on the present invention to polarizing laminations of the character heretofore described and shown, for example, in FIG. 1 measurably decreases surface haze. By this it is to be understood that a lens coated in accordance with the present invention will show initially less surface haze than an uncoated lens, wholly apart from any question of its subsequent resistance to scratch or abrasion.

Since certain changes may be made in the above processes without departing from the scope of the invention herein involved, it is intended that all matter contained in the above description or shown in the accompanying drawing shall be interpreted as illustrative and not in a limiting sense.

What is claimed is:

1. A continuous process for applying a mar-resistant cross-linked, thermoset plastic coating to a sheet of plastic material without causing crazing and cracking of said thermoset coating, said process comprising applying a coating solution comprising a polymerizable monomer of a diethylenic derivative of a polyalkyleneglycol comprising 3 to 5 alkylene groups, said alkylene groups comprising 2 to 3 carbon atoms, and a polymerization catalyst to the surface of said plastic material, holding the film of said coating solution, while said sheet of plastic material is advancing, in contact with the peripheral, optically smooth surface of a rotating, heated, cylindrical element until said coating is polymerized to a cross-linked thermoset polymer and then removing and straightening the resulting coated sheet.

2. A process as defined in claim 1 wherein said coating is about 0.001 to 0.002 inch thick.

3. A process as defined in claim 1 wherein said alkylene groups are ethylene groups.

4. A process as defined in claim 1 wherein said diethylenic derivative of a polyalkyleneglycol is a diester of the polyalkyleneglycol and an $\alpha,\beta$-unsaturated polymerizable carboxylic acid.

5. A process as defined in claim 1 wherein said monomer is tetraethyleneglycoldimethacrylate.

6. A process as defined in claim 1 wherein said coating solution comprises about 5 to 10% of cellulose nitrate.

7. A process as defined in claim 1 wherein said sheet of plastic material is a sheet of plastic optical material.

8. A process as defined in claim 7 wherein said thermoplastic layers are cellulosic derivatives.

9. A process as defined in claim 1 wherein said sheet of plastic material comprises a light-polarizing layer sandwiched between two thermoplastic layers.

10. A process as defined in claim 1 wherein said catalyst is diisopropylperoxydicarbonate.

11. A continuous process for applying a mar-resistant, cross-linked, thermoset plastic coating to a sheet of plastic material without causing crazing and cracking of said thermoset coating, said process comprising applying a coating solution comprising a polymerizable monomer of a dimethacrylate of a polyethyleneglycol, said polyethyleneglycol having an average molecular weight of about 200, and a polymerization catalyst to the surface of said plastic material, holding the film of said coating solution, while said sheet of plastic material is advancing, in contact with the peripheral, optically smooth surface of a rotating, heated, cylindrical element until said coating is polymerized to a cross-linked thermoset polymer and then removing and straightening the resulting coated sheet.

References Cited in the file of this patent
UNITED STATES PATENTS

| | | |
|---|---|---|
| 2,320,536 | Pollack et al. | June 1, 1943 |
| 2,516,064 | Marks | July 18, 1950 |
| 2,527,400 | Cooper | Oct. 24, 1950 |
| 2,631,960 | Dafter | Mar. 17, 1953 |
| 2,719,132 | Schweitzer | Sept. 27, 1955 |
| 2,746,878 | Rush | May 22, 1956 |
| 2,760,883 | Pickett | Aug. 28, 1956 |
| 2,772,986 | Buck | Dec. 4, 1956 |
| 3,019,131 | Haas | Jan. 30, 1962 |